United States Patent [19]
Conley et al.

[11] 4,007,808
[45] Feb. 15, 1977

[54] LINE SECURING DEVICE

[76] Inventors: George R. Conley; Gerald F. Conley, both of 2436 S. Holloway St., Fresno, Calif. 93725

[22] Filed: Jan. 8, 1975

[21] Appl. No.: 539,346

[52] U.S. Cl. .................... 182/142; 24/230.5 AD; 254/135 R
[51] Int. Cl.[2] .................................. E04G 1/18
[58] Field of Search ........ 254/135 R, 135 CE, 144; 187/2; 182/10, 133, 142, 145, 150, 112; 114/218; 248/65, 328; 24/115, 129, 230.5

[56] References Cited
UNITED STATES PATENTS

| 939,618 | 11/1909 | Neller et al. ............... 254/135 R |
| 1,361,249 | 12/1920 | Giffin ..................... 24/230.5 AD |
| 2,256,582 | 9/1941 | Sorensen ..................... 182/142 |
| 2,582,385 | 1/1952 | Knudsen ...................... 182/150 |
| 2,934,302 | 4/1960 | Langert ...................... 182/142 |

| 3,215,390 | 11/1965 | Shelter ................. 24/230.5 TD |

FOREIGN PATENTS OR APPLICATIONS

| 199,275 | 6/1923 | United Kingdom ....... 24/230.5 AD |
| 550,162 | 12/1942 | United Kingdom ....... 24/230.5 SA |

*Primary Examiner*—Robert J. Spar
*Assistant Examiner*—Kenneth Neland
*Attorney, Agent, or Firm*—Huebner & Worrel

[57] ABSTRACT

A line securing device having a rigid rod with opposite end portions and being successively return bent intermediate said end portions to form a pair of workload supporting loops extending laterally of the end portions in one direction and a single line attaching loop extending laterally of the end portions in the opposite direction.

4 Claims, 5 Drawing Figures

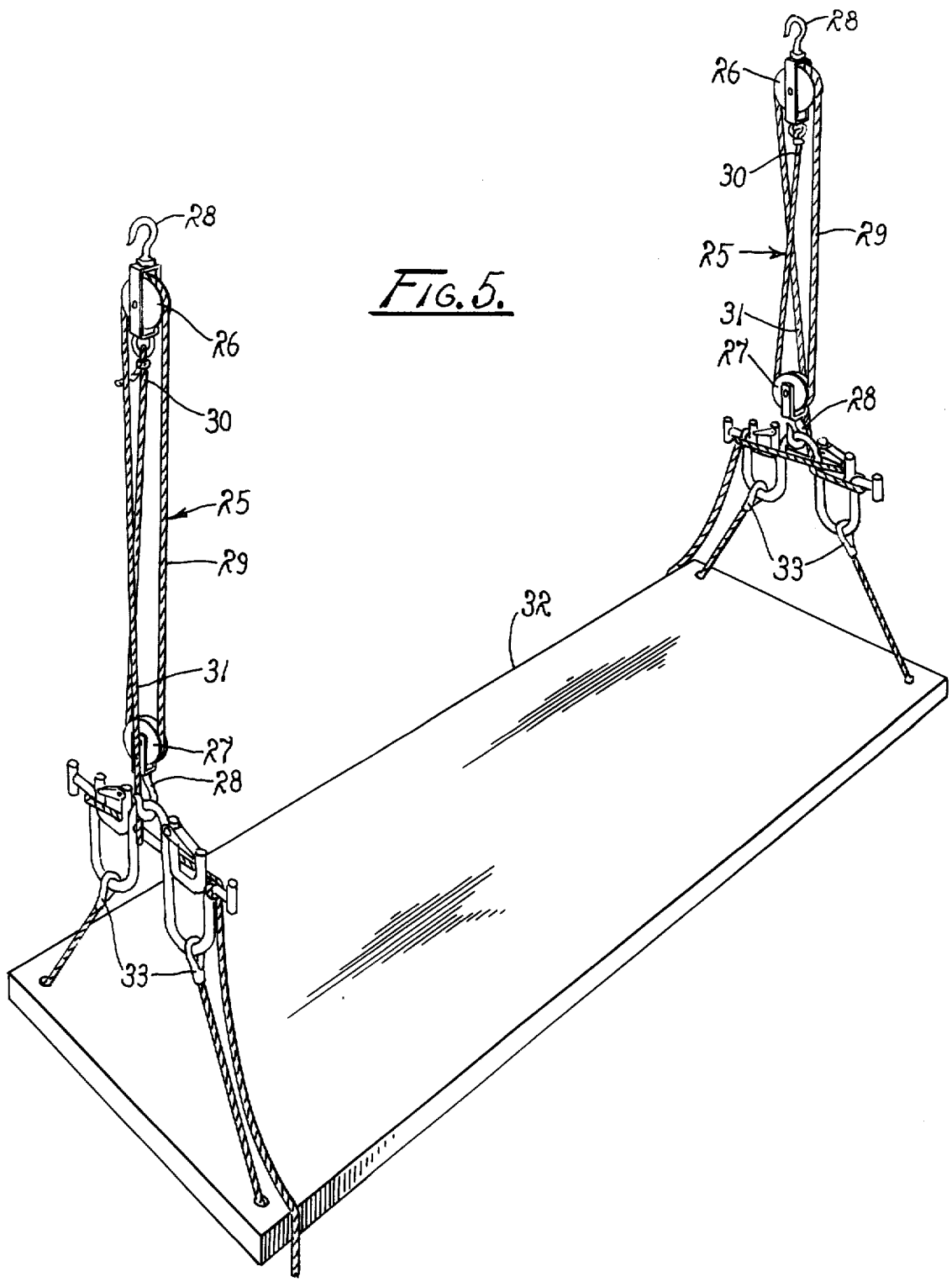

LINE SECURING DEVICE

BACKGROUND OF THE INVENTION

The present invention relates to a line securing device and more particularly to such a device which consists of a frame adapted for use with virtually any form of block and tackle assembly in the support of a workload and wherein one end of the line of the block and tackle assembly is fastened on the frame and the free portion of the line is looped successively about selected portions of the frame to support the workload at a selected elevational position while facilitating release of the line for elevational readjustment.

Block and tackle assemblies of diverse configurations have historically been used to facilitate the lifting, lowering and handling of workloads. The primary purpose in the use of such assemblies is to obtain a mechanical advantage over the weight of the workload to be moved. It is, of course, well known that the specific mechanical advantage obtained is controlled by the specific combination of pulley blocks and lines.

The use of most such block and tackle assemblies requires the otherwise free portion of the line extended about a pulley block to be secured or tied off in order to support the workload at a selected elevation. For example, in the maintenance of ocean going vessels it is frequently necessary to support a contrivance, such as a boatswain's chair on which a seaman is seated, at a selected elevational position in order to permit painting or other maintenance of the exterior of the vessel. Conventionally, such securing or tying off of the line is accomplished by lashing the free portion of the line to an available structure or by the seaman simply wrapping the line about himself to facilitate release of the line for repositioning the boatswain's chair.

Such conventional methods and apparatus are unsatisfactory for a variety of reasons. If the free portion of the line is lashed to an available structure, valuable time is lost in freeing the line for repositioning of the chair and again lashing the line to an available structure. Furthermore, there may be no readily available structure for such purpose. Where the free portion of the line is simply wrapped about the body of the seaman, considerable danger resides in the possibility that inattention can result in release of the line allowing the chair to plunge from the supported position.

Therefore, it has long been recognized that it would be desirable to have a line securing device which assists in the use of block and tackle assemblies by facilitating the securing and releasing of the free portion of the line for positioning and repositioning of the workload suspended therefrom while insuring dependable support at any selected position.

SUMMARY OF THE INVENTION

Accordingly, it is an object of the present invention to provide an improved line securing device.

Another object is to provide such a device which is operable to facilitate the use of block and tackle assemblies and other forms of lifting and workload handling devices.

Another object is to provide such a device which can be employed rapidly to secure the free portion of a line of a block and tackle assembly securely and reliably to support a workload at a selected position and to facilitate release of the free portion of the line for readjustment of the assembly to reposition the workload.

Another object is to provide such a device which assists in reducing the risk of accidents encountered in the use of block and tackle assemblies.

Another object is to provide such a device which assists in maintaining the stability of the workload supported thereon by resisting torsion and imbalance.

Another object is to provide such a device which is adapted for use in a variety of types and specific configurations of block and tackle assemblies and other forms of lifting devices without modification.

Another object is to provide such a device which is of relatively light weight and small size so as not to detract from the use of block and tackle assemblies.

A further object is to provide such a device which has a structure highly resistant to damage even when subjected to the abusive treatment conventionally encountered.

Further objects and advantages are to provide improved elements and arrangements thereof in a device for the purposes described which is dependable, economical, durable and fully effective in accomplishing its intended purposes.

BRIEF DESCRIPTION OF THE DRAWINGS

FIG. 5 is a perspective view of a second operative environment for the device.

DESCRIPTION OF THE PREFERRED EMBODIMENT

Figure 1:
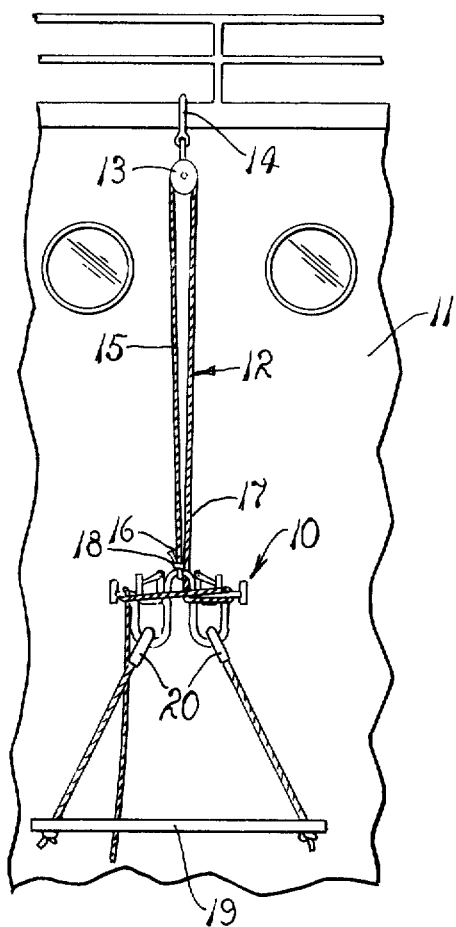
FIG. 1 is a front elevation of the line securing device of the present invention shown in a fragmentarily represented operative environment.

Referring in greater detail to the drawings, the line securing device of the present invention is generally indicated by the numeral 10 in FIG. 1. In the operative environment illustrated in FIG. 1, the device is shown in use aboard an ocean going vessel fragmentarily shown at 11 and with a block and tackle assembly 12. The block and tackle assembly consists of a conventional pulley block 13 having a hook or other means of attachment 14 mounted thereon. A rope or line 15 is operably extended through the pulley block in the conventional fashion. The line has a securing end portion 16 which is shown secured on the line securing device by a suitable knot 18 tied therein. A boatswain's chair 19 is mounted on the securing device opposite to the block and tackle assembly by a pair of snap fasteners 20 of any suitable form.

Another operative environment for the line securing device 10 is shown in FIG. 5. As shown, two line securing devices are employed in combination with a pair of block and tackle assemblies 25. Each block and tackle assembly is of identical construction having an upper and a lower pulley block 26 and 27 respectively. Each pulley block mounts a hook 28. A line 29, having a securing end portion 30 and a free portion 31, is affixed to the upper pulley block of each assembly by its securing end portion and extended through the lower pulley block, back through the upper pulley block and then extended therebelow, as shown in FIG. 5. The hook mounted by the upper pulley block of each assembly is adapted for attachment to a suitable means of support, such as a structural member of a building. The hook borne by the lower pulley block is attached to its respective line securing device 10, as will subsequently be described. A platform assembly 32 is shown in FIG. 5 mounted on the pair of line securing devices. The assembly mounts snap rings 33 which are employed to attach the assembly to the line securing devices.

The line securing device 10 of the present invention consists of a frame 40 formed predominantly from a member or rod 41. Although it will become apparent that the rod can be constructed of a variety of materials depending upon the stress and load requirements of the particular application to which it is to be directed, in most areas of application the rod is preferably formed from cold rolled steel.

As will be seen, the rod is successively return bent to form the majority of the frame. Thus, the rod has a substantially straight first end portion 42. The rod is bent substantially normal to the end portion extending a selected distance and then return bent away from the end portion to form a first loop 43. The rod extends in substantially right-angular relation to and past the first end portion and is thereupon return bent away from the end portion to form a second loop or central portion 44. The rod is then extended substantially parallel to the rod forming the adjacent portion of the first loop and is return bent to form a third loop 45 disposed in spaced relation to the first loop and extending laterally of the axis defined by the first end portion a distance equal to that of the first loop. The rod is then substantially right-angularly bent to form a second end portion 46 disposed in substantially coaxial alignment with the first end portion. The rod bent as described is disposed in a substantially common plane. It should be noted that the designation of the end portions as "first and second" is only for illustrative convenience. Opposite sides of the frame are identical which, as will be seen, permit a line to be secured thereto beginning with either the first or second end portion.

The remote ends of the first and second end portions 42 and 46 respectively, individually mount cleats 47 disposed in substantially right-angular relation to their respective end portions. A central cross piece 48 is secured on the portion of the rod 41 forming the second loop or central portion 44 and extends in substantially coaxial alignment with the end portions of the frame. The cleats and cross piece are preferably mounted in their described portions by welding.

Figure 2:
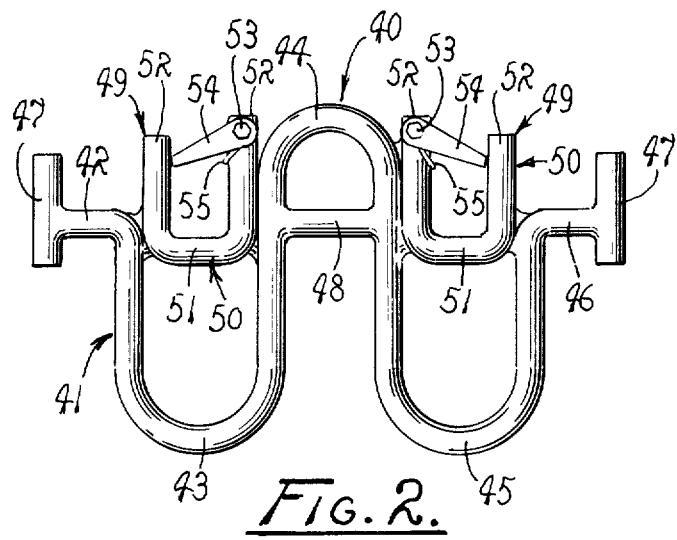
FIG. 2 is a somewhat enlarged front elevation of the device.

A pair of line retaining rings 49 are individually fastened on the rod 41 between the first end portion and the second loop and between the second loop and the second end portion, as best shown in FIG. 2. Each of the retaining rings is constructed from a U-shaped, return bent rod 50 having a central portion 51 with substantially parallel end portions 52. The central portion of each ring is offset, in the direction of the first and third loops 43 and 45 respectively, from the axis defined by the end portions 42 and 46 of the rod 41, as best shown in FIG. 2. The retaining rings are also preferably mounted in their respective positions by welding.

Figure 4:
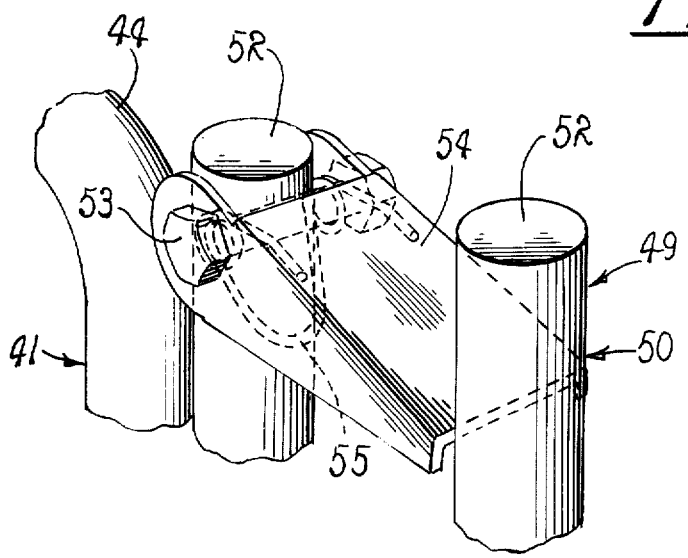
FIG. 4 is a somewhat further enlarged fragmentary perspective view of a portion of the device.

A pivot pin 53 is laterally extended through one end portion 52 of each retaining ring 49. Each pin mounts a closure 54 thereon for pivotal movement to and from the opposite end portion of the ring. A spring 55 is resiliently wound about the pivot pin engaging the end portion and the closure resiliently to retain the closure in engagement with the opposite end portion, as best shown in FIG. 4.

OPERATION

This operation of the described embodiment of the subject invention is believed to be clearly apparent and is briefly summarized at this point. The line securing device 10 of the present invention is operated in substantially the same manner regardless of the particular configuration of the block and tackle assembly employed. This can be seen in FIG. 1 with respect to assembly 12 and in FIG. 5 with respect to assemblies 25.

Figure 3:
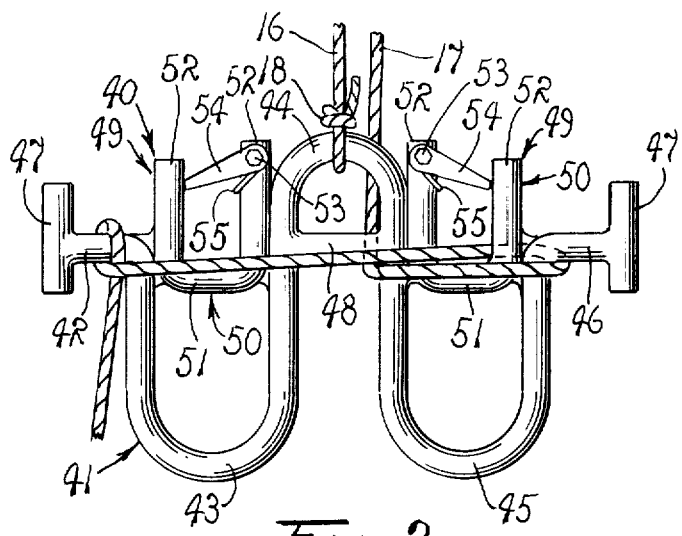
FIG. 3 is a front elevation of the device fragmentarily showing a line secured thereto.

The device 10 is mounted on the block and tackle assembly 12 by lashing the securing end portion 16 of line 15 about the rod 41 on the second loop 44 using a suitable knot 18, as best shown in FIG. 3. The boatswain's chair 19 is attached to the first and third loops 43 and 45 respectively of the device by fastening the snap rings 20 thereon, as shown in FIG. 1. The hook 14 of the pulley block 13 is then attached to a suitable means of support such as shown in FIG. 1 in the case of vessel 11.

The boatswain's chair 19 is then positioned by the operator feeding out or taking up sufficient line 15 through the pulley block 13, grasping the free portion 17 of the line, to position the boatswain's chair in the precise position desired for the work to be performed. Of course, the mechanical advantage achieved by use of the block and tackle assembly 12 eases the effort required for such positioning.

When the desired position is reached, the free portion 17 of the line 15 is secured on the device 10. This is accomplished by extending the free portion of the line under the central cross piece 48 of the frame 40, looping it under and about the second end portion 46, snapping the line into the adjacent retaining ring 49, and extending the line across the frame on the side thereof opposite that against which the free portion of the line is first constrained, as can best be seen in FIG. 3. The free portion of the line is then looped in a half hitch about the first end portion 42, as shown in FIG. 3. When the line is "tied off" as described, the binding engagement of the line upon itself and upon the frame, under the weight of the workload supported on the device, secures the free portion of the line on the device securely to retain the boatswain's chair in the position selected. It will be apparent that opposite halves of the securing device 10 are identical and can be identically utilized.

The use of the line securing devices 10 with the platform assembly 32 is substantially the same as previously described. In this case preferably two operators are employed permitting each to operate one block and tackle assembly and associated securing device. The hooks 28 borne by the upper pulley blocks 26 of the block and tackle assemblies 25 are attached to a suitable means of support, not shown. The platform assembly is attached to the pair of devices 10, as shown in FIG. 5, by snap rings 33 and the hooks 28 of the lower pulley blocks 27 are hooked under the second loops 44.

The platform assembly 32 is then positioned by the operators grasping the free portions 31 of the lines 29 by simultaneously feeding out or taking up sufficient line to motivate the platform assembly to the work position desired. When the selected position is reached, each of the operators extends the free portion of his line about the device 10 which he is using by extending the line under the cross piece 48, looping it about the second end portion 46 and into the adjacent retaining ring, extending the free portion of the line across the frame as previously described and looping it in a half hitch around the first end portion 42 to secure the line and therefore the platform assembly in the desired position.

When it is desired to reposition the boatswain's chair 19 or the platform assembly 32, such repositioning is performed in substantially the same manner. Lowering of the chair and the assembly is accomplished by grasping the free portions 17 and 31 of the respective lines 15 and 29 below the end portions 42 and pulling the free portions toward the central portions 44 of the frames so as to release binding engagement of the half hitches. The operators are thereby permitted to feed out the desired amounts of line while maintaining control over the amounts fed out by frictional engagement of the lines upon themselves. When the desired positions are reached, the lines are simply pulled in the opposite direction away from the central portions 44 tightly to secure the half hitches and thus the lines thereon. Depending upon the character of the lines employed and the weight of the workloads carried by the devices, release of the lines may require the half hitches to be removed from the first end portions to allow the lines to be slipped about the frames.

When it is desired to raise the boatswain's chair 19 or platform assembly 32, the free portions 17 and 31 of the lines 15 and 29 respectively are grasped above the devices 10 and pulled downwardly to elevate the line securing devices in the conventional manner. The free portions of the lines secured on the devices automatically loosen during such elevation so that they can be disconnected and subsequently resecured when the desired elevated positions are reached.

It will be seen that the spacing of the points of support by the second loop as well as the contact of free portions 17 and 31 by extension of the free portions of the lines 15 and 29 respectively in directions laterally of these points of suspension, a degree of lateral stability is provided which resists, to a certain extent, the torsion and imbalance characteristic of prior art devices.

Therefore, the line securing device of the present invention assists in the use of block and tackle assemblies by facilitating the securing and releasing the free portion of the line for positioning and repositioning the workload suspended therefrom while significantly reducing the dangers encountered in the use of block and tackle assemblies.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In combination with a block and tackle assembly including a pulley block, adapted for attachment to a means of support, and a line, having a securing portion and a free portion, operably extended through the block and back upon itself, a line securing device comprising a rigid metal rod extended to form a substantially straight first portion, bent substantially normal to itself and then return bent to form a workload supporting first loop, extended back past the first portion and return bent to form a second loop to which the securing portion of the line is adapted to be fastened, extended back past the first portion and return bent to form a workload supporting third loop laterally spaced from the first loop and bent substantially normal to itself to form a substantially straight second portion in substantial axial alignment with the first portion; a cross piece borne by the second loop of the rod in substantial axial alignment with the first and second portions of the rod and against which the free portion of the line is adapted to be constrained, the free portion then being looped over the first and second straight portions in succession to secure the line in supporting relation to a workload borne by the first and third loops; and a pair of line retaining rings, having spring closures, individually fastened on the rod between the first portion and the second loop and between the second loop and the second portion.

2. A line securing device comprising a unitary rigid element having upwardly extended support means centrally thereof and being substantially symmetrical on opposite sides thereof, said element having downwardly extended loop bearing means spaced on opposite sides of the support means, and tie-off means including line guide means centrally of the element through which a line can be drawn, endwardly extended rods about which such a line can be individually extended for tying-off about the opposite rod, and upwardly disposed line retainers on opposite sides of the support means between such support means and the rods adapted releasably to receive such a line between the rod about which the line is extended and the rod to which it is tied-off, each retainer including an upwardly disposed U-shaped member having spaced legs; a closure pivotally mounted on one of the legs of each retainer for pivotal movement to and from the other leg of that retainer; and resilient means urging the closure toward said other leg.

3. A device for supporting a workload to facilitate elevational repositioning thereof while affording inherent strength, the device comprising a rigid member having substantially axially aligned opposite end portions and being successively return bent intermediate the end portions to form a pair of spaced, return bent workload supporting portions extending laterally of the end portions in subtantially the same direction and a return bent line securing portion extending laterally of the end portions in a direction opposite to that of the supporting portions from a position substantially midway between said spaced supporting portions; and brace means including three braces interconnecting the return bent supporting and securing portions of the rigid member offset from precise axial alignment with the end portions sufficient to facilitate the extension of a free portion of a line under the brace of the securing portion, about one end portion, over the brace of the adjacent supporting portion and about the opposite end portion releasably to secure the free portion of the line.

4. The device of claim 3 wherein the braces of the supporting portions are return bent and mount spring closures to form line retaining rings.

* * * * *